US010199056B1

(12) United States Patent
Lammers et al.

(10) Patent No.: US 10,199,056 B1
(45) Date of Patent: *Feb. 5, 2019

(54) NOISE CANCELLATION IN MULTITRANSDUCER RECORDING

(71) Applicant: Seagate Technology LLC, Cupertino, CA (US)

(72) Inventors: Todd Michael Lammers, Lafayette, CO (US); JianHua Xue, Maple Grove, MN (US); Javier I. Guzman, Minneapolis, MN (US); Andrew Thomas Jaeb, Plymouth, MN (US); Bruce Douglas Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,786

(22) Filed: Jan. 15, 2018

Related U.S. Application Data

(63) Continuation of application No. 15/255,090, filed on Sep. 1, 2016, now Pat. No. 9,886,970.

(51) Int. Cl.
| G11B 20/20 | (2006.01) |
| G11B 5/09 | (2006.01) |
| G11B 5/48 | (2006.01) |
| G11B 5/17 | (2006.01) |

(52) U.S. Cl.
CPC ............... *G11B 5/09* (2013.01); *G11B 5/17* (2013.01); *G11B 5/4853* (2013.01)

(58) Field of Classification Search
CPC .......... G11B 5/012; G11B 27/36; G11B 5/02; G11B 20/20; G11B 20/16; G11B 2220/90; G11B 20/10009; G11B 5/09; G11B 20/10
USPC ................ 360/46, 67, 75, 25, 26, 27, 31, 39
See application file for complete search history.

(56) References Cited

U.S. PATENT DOCUMENTS 6,542,325 B1   4/2003   Molstad et al.

FOREIGN PATENT DOCUMENTS

WO       2015016782       2/2015

*Primary Examiner* — Nabil Z Hindi
(74) *Attorney, Agent, or Firm* — Cesari & Reed, LLP; Kirk A. Cesari

(57) ABSTRACT

In certain embodiments, an apparatus may comprise a first output driver connected to a first output via a first trace and a second output driver connected to a second output via a second trace. The first output driver may be configured to output a first drive signal to the first output to drive the first output and the first drive signal may cause first induced noise in the second trace. Further, the second output driver may be configured to output a second drive signal based on the first drive signal where the second drive signal may reduce the magnitude of the first induced noise at the second output.

20 Claims, 13 Drawing Sheets

NOISE CANCELLATION IN MULTITRANSDUCER RECORDING

CROSS-REFERENCE TO RELATED APPLICATIONS

This application is a continuation of and claims priority to co-pending U.S. patent application Ser. No. 15/255,090, entitled "NOISE CANCELLATION IN MULTITRANSDUCER RECORDING", which was filed Sep. 1, 2016, the contents of which is incorporated herein by reference in its entirety.

SUMMARY

In certain embodiments, a system may comprise a first output driver connected to a first output via a first trace and a second output driver connected to a second output via a second trace. The first output driver may be configured to output a first drive signal to the first output to drive the first output and the first drive signal causing first induced noise in the second trace. In addition, the second output driver may be configured to output a second drive signal based on the first drive signal and the second drive signal may reduce the magnitude of the first induced noise at the second output.

In certain embodiments, an apparatus may comprise a first output driver, a first trace that may be connected to a first output at a first terminal of the first trace, a second trace that may be connected to a second output at a first terminal of the second trace, a shared trace that may be connected to the first output and the second output at a first terminal of the shared trace. Further, the apparatus may comprise a first switch that may be configured to selectively connect a first terminal of the first output driver to a second terminal of the first trace in response to a first control signal and to selectively connect the first terminal of the first output driver to a second terminal of the shared trace in response to a second control signal. In addition, the apparatus may comprise a second switch that may be configured to selectively connect a second terminal of the first output driver to the second terminal of the shared trace in response to the first control signal and to selectively connect the first terminal of the first output driver to a second terminal of the second trace in response to the second control signal. Moreover, the first output driver may be configured to output a first drive signal to the first output to drive the first output in response to the first control signal and the first drive signal may cause first induced noise at the second output.

In certain embodiments, a system may comprise a first write driver having a first terminal of the first write driver that may be connected to a first terminal of a first writer coil via a first trace, a second write driver having a first terminal of the second write driver may be connected to a first terminal of a second writer coil via a second trace. Further, the first write driver may be configured to output a first drive signal to the first writer coil to drive the first writer coil where the first drive signal may cause first induced noise in the second trace. In addition, the second write driver may be configured to output a second drive signal based on the first drive signal and the second drive signal may reduce the magnitude of the first induced noise at the second writer coil.

DETAILED DESCRIPTION

Figure 1:
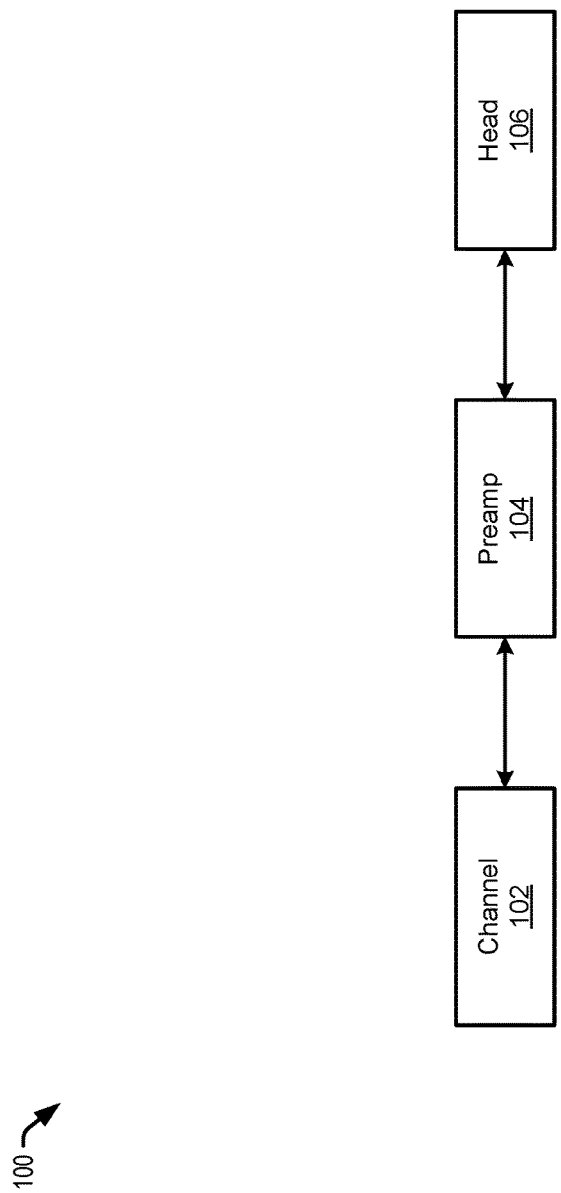
FIG. 1 is a block diagram of a system of noise cancellation for simultaneous sensor and writer operation and multi-transducer recording, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

The present disclosure generally relates to noise cancellation, and in some embodiments, the present disclosure relates to noise cancellation for simultaneous sensor and writer operation and noise cancellation in multi-transducer recording. Some systems, such as electrical, electronic, motor drive, processing, or other systems may include one or more sensors adjacent to transducers or multiple adjacent transducers or sensors or transducers whose circuit traces are adjacent. In some such systems, simultaneous operation of these circuits may cause interference that may degrade their operation.

For example, such interference may occur when a write element or write coil of a read/write head in magnetic recording is being driven to output a write signal while a sensor, such as a read head, is receiving a read signal. The write driver may be a bi-polar circuit that drives current of both polarities through a write element of a read/write head. The current profile may consist of a steady state current (Iwss), overshoot, duration and a specific rise time. The timing and structure of the writer current pulses may be related to the electric and magnetic field strength and frequency content that is present surrounding the interconnect(s) and within the head. Adjacent traces to the one being driven may be mechanically isolated but may share a mutual capacitance and inductance. This shared capacitance and inductance may allow the fields setup by the current driver to interact and may induce voltage on neighboring traces. This may be called capacitive coupling and inductive coupling. The coupled signal on the victim lines may present itself to the near end (the side closest to the driver) and the far end closest to the load (e.g., the writer coil in the head). The resulting signals coupled onto on the victim traces from the aggressor source may be measured and estimated via a transfer function that represents the capacitive and inductive behavior between the traces. The disclosed systems and techniques may reduce or eliminate the coupled signals in such cases.

The following examples are discussed in the context of the read/write channel-preamplifier-head path of a hard disk drive. However, this is merely for ease of discussion and context. Further, embodiments of the disclosed subject matter are not limited to this context.

Referring to FIG. 1, a block diagram of a system of noise cancellation for simultaneous sensor and writer operation and multi-transducer recording is shown and is generally designated 100. More particularly, the system 100 provides a context for the examples shown in FIGS. 2-13. The system 100 can include a channel 102 that may be coupled to a preamplifier (preamp) 104 that may be coupled to a head 106.

Each of the channel 102, preamp 104, and head 106 may be a separate circuit, part of a system on chip (SOC), firmware, a processor(s), or other system not listed, or any combination thereof.

During a write operation, the write portion of the channel 102 may encode the data to be written onto the storage medium. For example, the channel 102 may process the signal for reliability and may include, for example error correction coding (ECC), run length limited coding (RLL), and the like. The channel 102 outputs write signals to the preamp 104 when writing data.

The preamp 104 includes a write portion and a read portion. While writing data, the preamp 104 amplifies the write signals. The amplified write signals are output to the write portion of the head 106.

The head 106 includes a write element or write coil such as an inductor that generates a magnetic field. While writing data, a write current flows through the write element of the head 106 that is switched to produce a magnetic field having a positive or negative polarity. The positive or negative polarity is stored by the hard drive platter and is used to represent data.

The head 106 also includes a read element (such as a magneto-resistive (MR) element) that senses the magnetic fields, for example, on a platter of a hard disk drive. When reading data, the preamp circuit 104 receives signals from the read portion of the head 106, amplifies the signals and outputs amplified read signals to the read portion of the channel 102.

During read operations, the read portion of the channel 102 converts an analog output from the medium to a digital signal. The converted signal is then detected and decoded to recover the data written on the hard disk drive.

Figure 2:
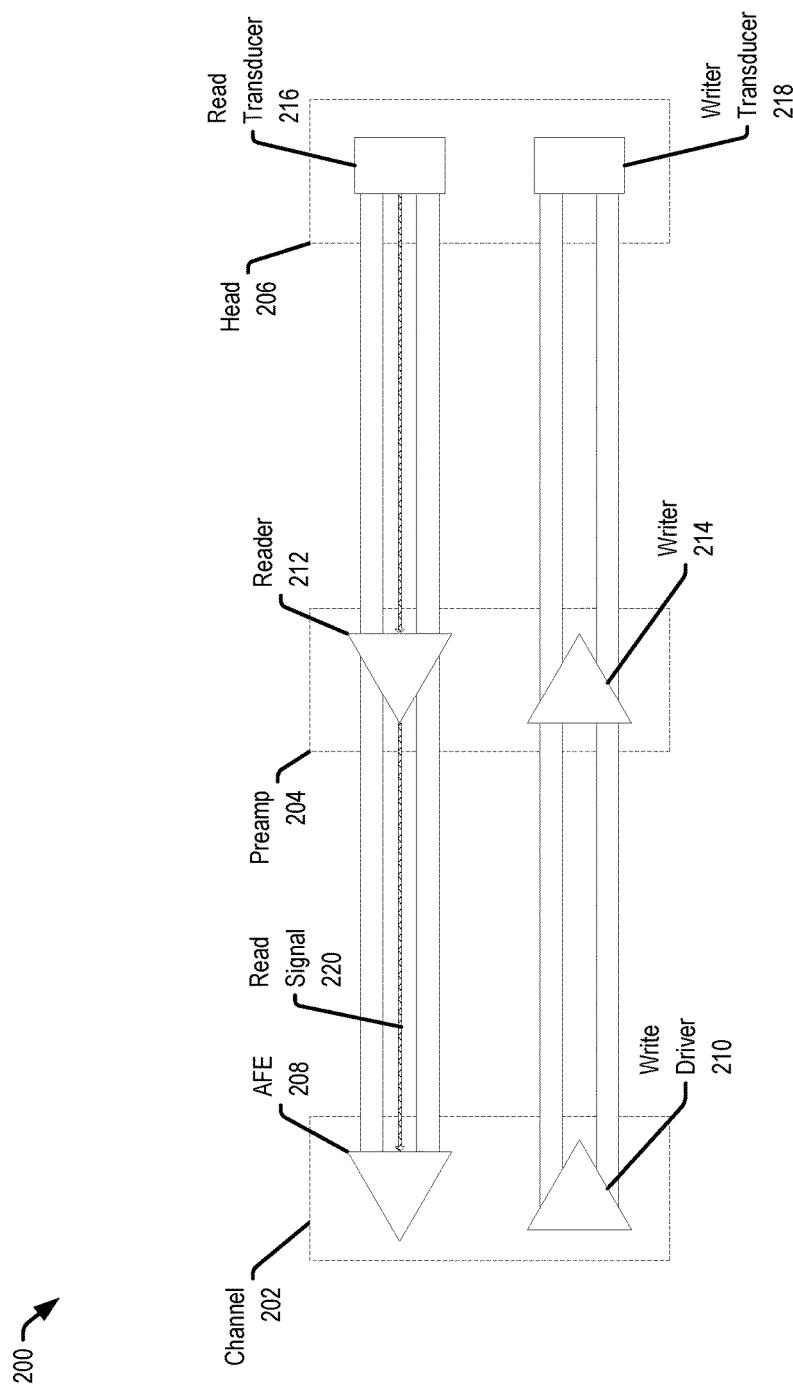
FIG. 2 is a block diagram of a system of noise cancellation for simultaneous sensor and writer operation, in accordance with certain embodiments of the present disclosure.
Figure 3:
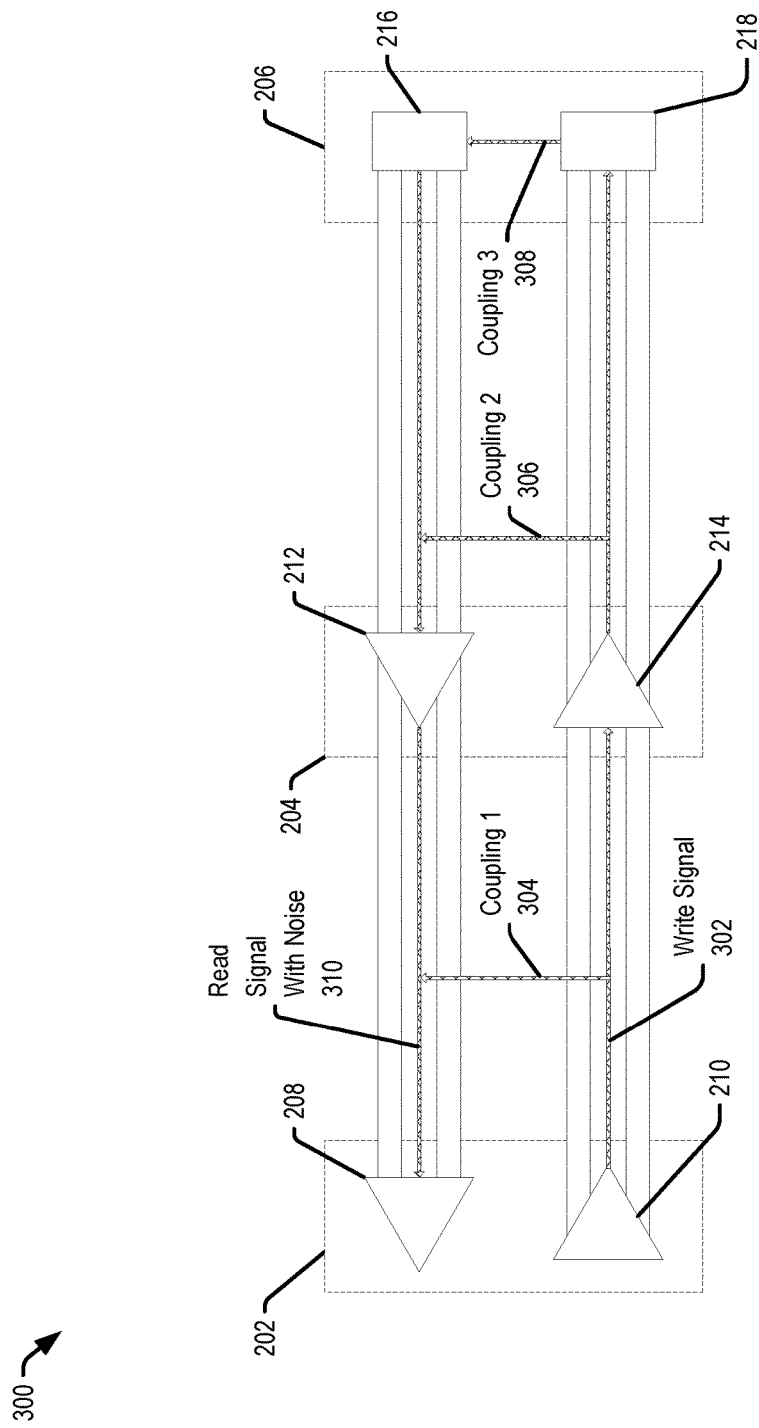
FIG. 3 is a block diagram which illustrates noise coupling in a system which includes simultaneous sensor and writer operation, in accordance with certain embodiments of the present disclosure.
Figure 4:
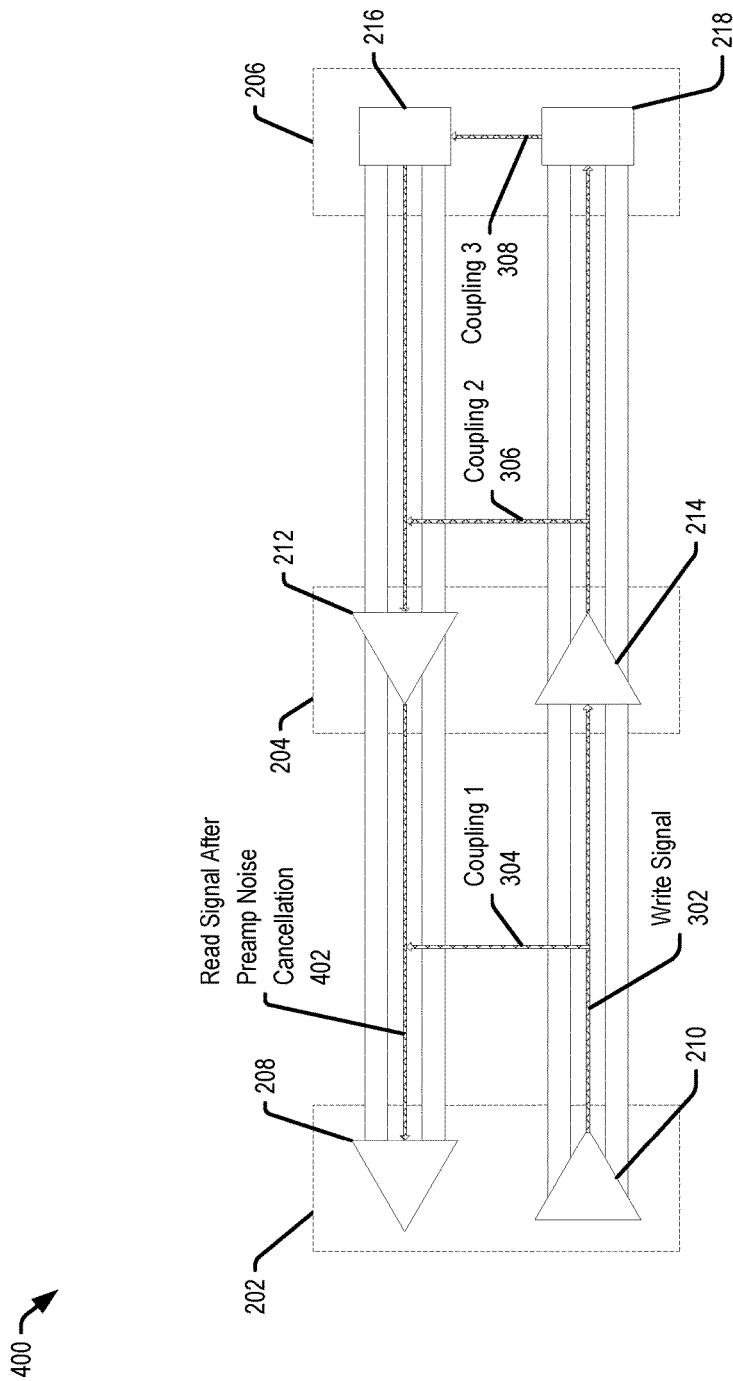
FIG. 4 is a block diagram of a system of noise cancellation for simultaneous sensor and writer operation, in accordance with certain embodiments of the present disclosure.

FIGS. 2-4 relate to noise cancellation on adjacent sensor elements during a write operation. While the example illustrated relates to the adjacent sensor being a read transducer, embodiments are not limited. For example, the adjacent sensor may instead be thermal asperity sensors (e.g. DETCR/HDI), laser power monitors, and so on.

Referring to FIG. 2, a block diagram of a system of noise cancellation for simultaneous sensor and writer operation is shown and is generally designated 200. System 200 can include a channel 202 that may be coupled to a preamplifier (preamp) 204 that may be coupled to a head 206. Generally, the operations of the channel 202, preamp 204, and head 206 are the same as the channel 102, preamp 104, and head 106 described above with regard to FIG. 1 and will not be described again.

As illustrated, the channel 202 may include an analog front end (AFE) 208 and a write driver 210. The AFE 208 and the write driver 210 may be coupled to a reader 212 and a writer 214 of the preamp 204, respectively. The reader 212 and the writer 214 may be coupled to a read transducer 216 and a write transducer 218 of the head 206, respectively. Each of the channel 202, preamp 204, head 206, AFE 208, a write driver 210, reader 212, writer 214, read transducer 216 and a write transducer 216 may be a separate circuit, a system on chip (SOC), firmware, a processor(s), or other system not listed, or any combination thereof.

FIG. 2 illustrates a read operation without a simultaneous write operation. In particular, the read transducer 216 of the head 206 may sense a magnetic field and generate a read signal 220 that is provided to the preamp 204. In turn, the preamp 204 may amplify the read signal 220 and output the read signal 220 to the AFE 208. In the illustrated scenario, the write path (items 210, 214 and 218) of the system 200 may be inactive. As such, the write path may not induce noise in the read path (items 208, 212 and 216) of the system 200.

Referring to FIG. 3, a block diagram which illustrates noise coupling in a system which includes simultaneous sensor and writer operation is shown and is generally designated 300. In particular, system 300 may include items 202-218 of FIG. 2 in a scenario in which the write path of the system 300 is active while the read path is operating. Generally, the operations of items 202-218 may be the same as described above with regard to FIG. 2 and will not be described again.

The write driver 210 may output a write signal 302 to the writer 214 of the preamp 204. The writer 214 of the preamp 204 may perform various operations on the write signal, such as amplifying the signal, and output the write signal to the write transducer 218 of the head 206.

When in operation, the write signal 302 along the write path may cause coupling 1 304 and coupling 2 306 across the traces connecting the channel 202 to the preamp 204 and connecting preamp 204 to the head 206, respectively. Further, the write signal 302 may cause coupling 3 308 between the write transducer 218 and the read transducer 216 of the head 206. As such, the read signal 310 received at the AFE of the channel may include noise induced by couplings 304-308 of the write path and read path.

Referring to FIG. 4, a block diagram of a system of noise cancellation for simultaneous sensor and writer operation is shown and is generally designated 400. In particular, system 400 may include items 202-218 of FIG. 2 in a scenario in which the write path of the system 400 is active while the read path is operating. Generally, the operations of items 202-218 may be the same as described above with regard to FIG. 2 and will not be described again. Further, system 400 may include cancellation filter circuitry that filters or otherwise cancels the noise in the read signal 402. Depending on the embodiments, the system 400 may have cancellation circuitry in the preamp, the channel, both or in other locations, such as the motor controller. The generation of the read signal after noise cancellation 402 will be described in more detail below.

Figure 5:
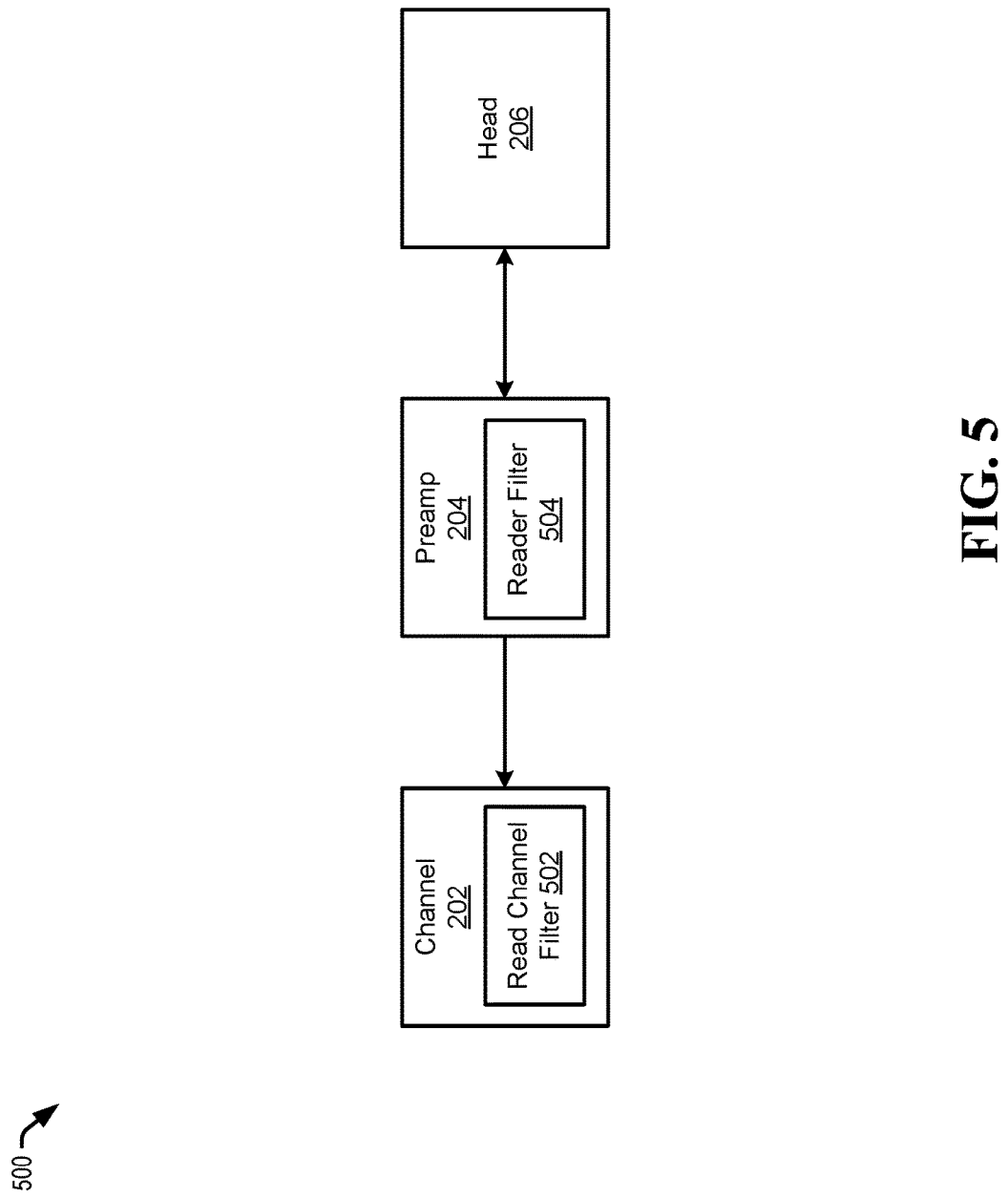
FIG. 5 is a block diagram of a system of noise cancellation for simultaneous sensor and writer operation, in accordance with certain embodiments of the present disclosure.

Referring to FIG. 5, a block diagram of a system of noise cancellation for simultaneous sensor and writer operation is shown and is generally designated 500. In particular, in FIG. 5, the channel 202 and the preamp 204 are illustrated to include a read channel filter 502 and a reader filter 504, respectively. The filters 502 and 504 operate to reduce or eliminate the noise induced by couplings 304-308 of the write path and read path.

In some embodiments, one or both of the filters 502 and 504 may be a static or programmable noise cancellation filter. Due to the relatively fixed environment within, for example, a hard disk drive, transfer functions between an aggressor trace and an adjacent trace may be calculated. Based on the calculated transfer function(s), a fixed or programmable analog filter may generate an approximated noise signal via the one or more transfer functions to approximate the noise. The approximated noise may then be subtracted from the noisy read signal to reduce or eliminate the noise. An example of a programmable noise cancellation filter is shown in FIG. 6.

Figure 6:
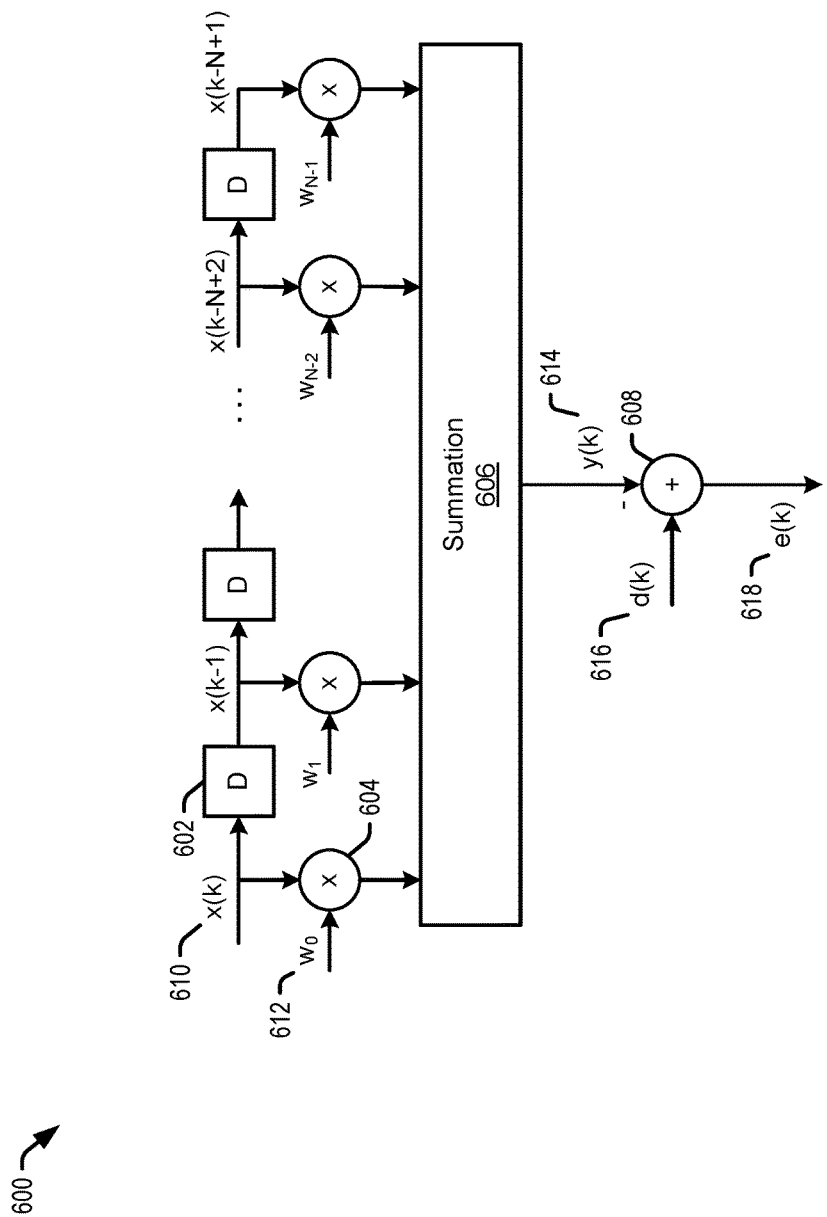
FIG. 6 is a block diagram of a system of noise cancellation for simultaneous sensor and writer operation, in accordance with certain embodiments of the present disclosure.

Referring to FIG. 6, a block diagram of a system of noise cancellation for simultaneous sensor and writer operation is shown and is generally designated 600. As mentioned above, system 600 illustrates an example of a fixed or programmable noise cancellation filter. In particular, system 600 includes a finite impulse response (FIR) filter of length N.

As illustrated, the FIR filter may include a series of delays 602, multipliers 604 and a summation 606 that may collectively operate on the write signal x(k) 610 using fixed or programmed tap coefficients w 612 to determine an approximated noise signal y(k) 614 as:

$$y(k) = \sum_{l=0}^{N-1} x(k-l)w_l$$

where N is the number of taps of the filter.

As mentioned above, the tap coefficients w 612 may be set or programmed to approximate the transfer function between the aggressor trace and the adjacent trace. Once the approximated noise signal y(k) 614 has been determined, it may be output to the adder 608.

The adder 608 may subtract the approximated noise signal y(k) 614 from the noisy read signal d(k) 616 to generate a cleaned read signal e(k) 618.

Figure 7:
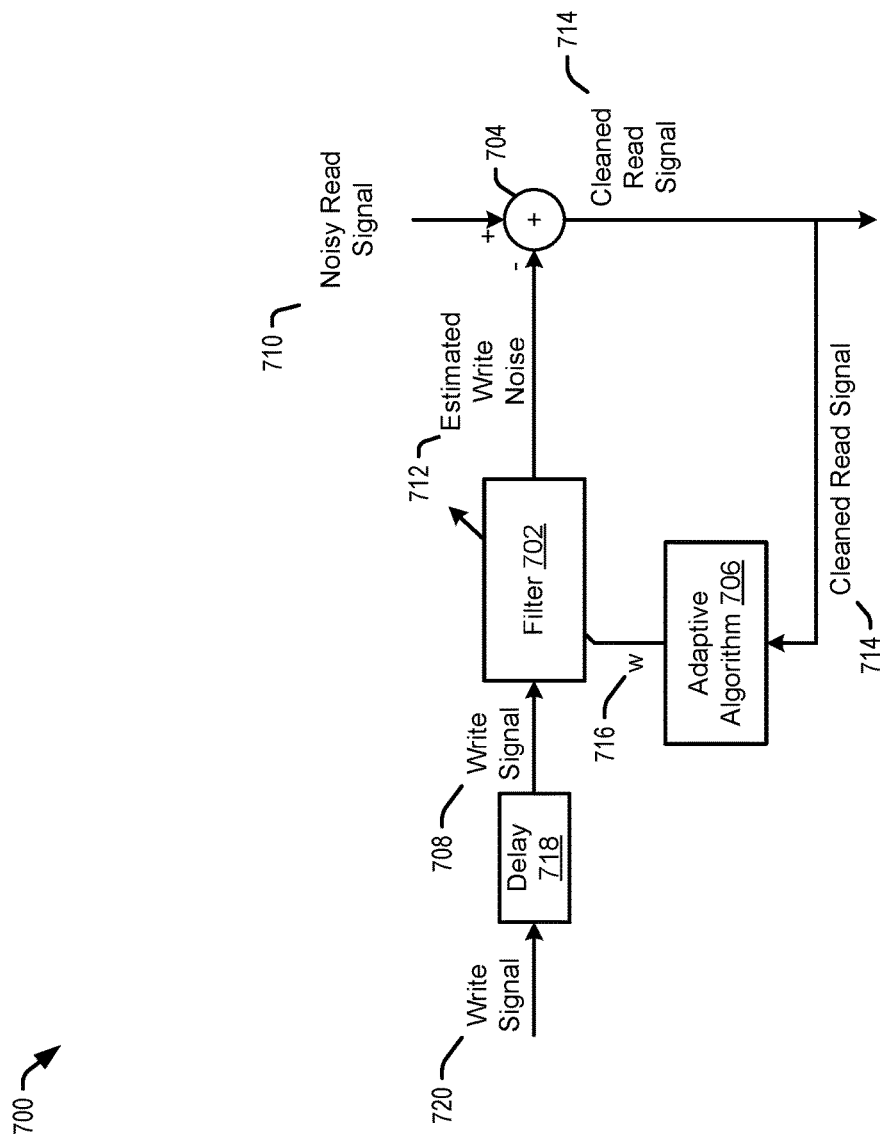
FIG. 7 is a block diagram of a system of noise cancellation for simultaneous sensor and writer operation, in accordance with certain embodiments of the present disclosure.

Alternatively or additionally, one or both of the filters 502 and 504 may be adaptive filters. For example, in some embodiments, the filter 504 may include a three to five tap analog finite impulse response filter and an LMS adaptation circuit to update the FIR tap coefficients to reduce the error term using LMS and thus reduce or eliminate the noise at the input to the preamp. An example of an adaptive noise cancellation filter is shown in FIG. 7. While an exemplary FIR configuration is illustrated in FIGS. 6 and 7, embodiments are not so limited and other mathematically similar or equivalent configurations, such as the transposed form, may be used.

Referring to FIG. 7, a block diagram of a system of noise cancellation for simultaneous sensor and writer operation is shown and is generally designated 700. As mentioned above, system 700 illustrates an example of an adaptive noise cancellation filter. In particular, system 700 may include a filter 702, an adder 704, an adaptive algorithm 706 and a delay 718.

In operation, the delay 718 may receive a write signal 720 and may output a write signal 708. The delay 718 may operate to delay the input of a particular write signal to the filter 702 to account for a difference between a time at which the channel or preamp output the particular write signal to the write head and a time at which the channel or preamp receives a noisy read signal affected by that particular write signal.

The filter 702 may receive the write signal 708 and may generate an estimated write noise 712 based on the write signal 708 and adaptive tap coefficients w 716. The adder 704 may receive the estimated write noise 712 and the noisy read signal 710. The adder 704 may operate to subtract the estimated write noise 712 from the noisy read signal 710 to generate a cleaned read signal 714. The adaptive algorithm 706 may utilize the cleaned signal 714 in updating the tap coefficients w 716 of the filter 702.

Taking read-while-write systems as an example, the training of the tap coefficients may be performed as follows. Prior to a track read, the adaptive filter may be trained without the presence of read signals to estimate the induced noise during write on any head. These filter tap coefficients may be stored for noise removal during upcoming reads. Then, during the simultaneous read and write procedure, the adaptive filter may reduce or eliminate the induced write noise from the read signal. Optionally, real-time noise removal and update via LMS may be performed using the write noise as a reference input to the adaptive filter. In an example hard disk drive system, this training and adaption and ultimately seed tap coefficient storage may take place for every (Write head, Zone)+(Read Head, Zone) combination in the drive as the transfer function for the write noise may be different in each case. In addition, if the system could identify dominant write noise sources, the retraining and tap storage may be simplified.

FIGS. 8-12 relate to systems that include noise cancellation in multi-transducer recording where coupling is present between proximal transducers. While the illustrated examples relate to the proximal transducers being a write transducers, embodiments are not limited. For example, the proximal transducers may instead be other output transducers, such as a laser.

Figure 8:
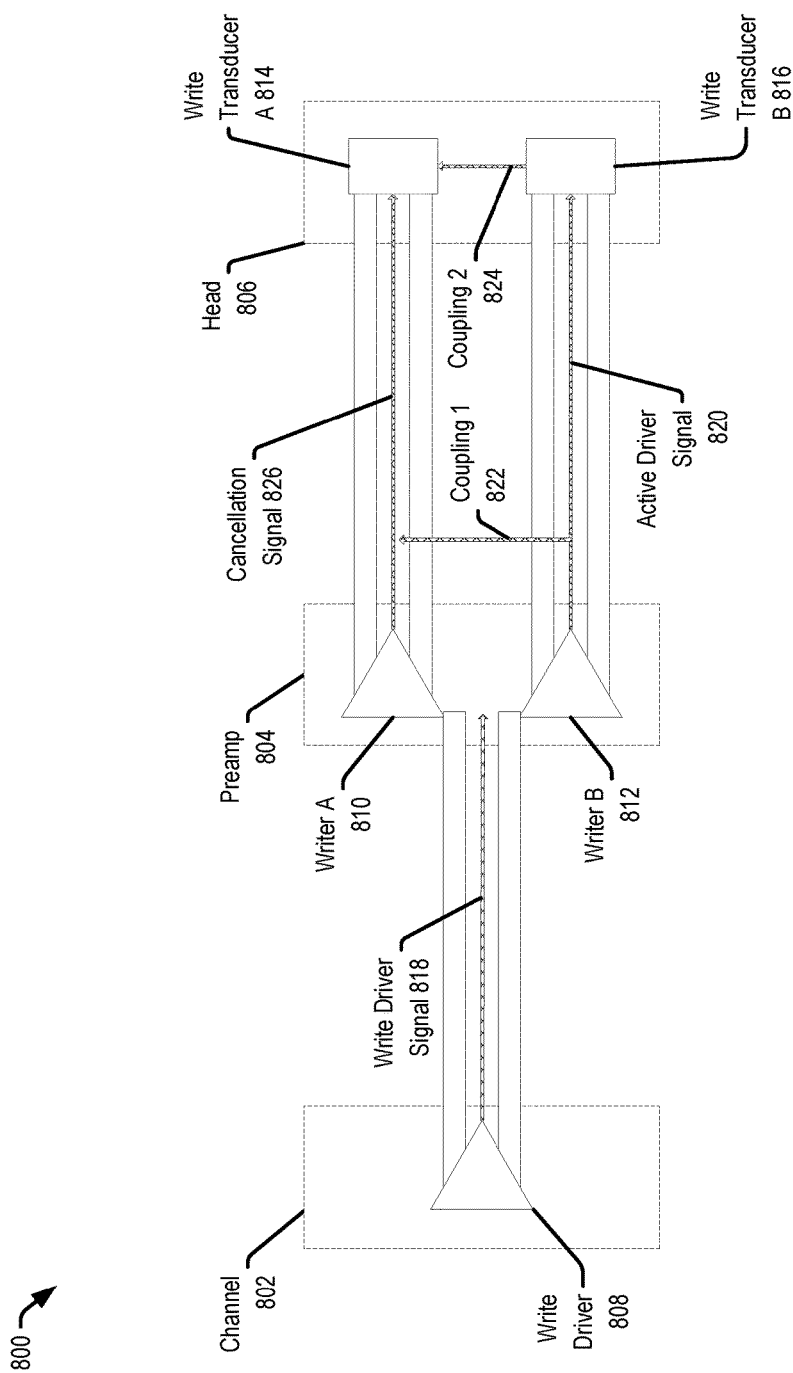
FIG. 8 is a block diagram of a system of noise cancellation in multi-transducer recording, in accordance with certain embodiments of the present disclosure.

Referring to FIG. 8, a block diagram of a system of noise cancellation in multi-transducer recording is shown and is generally designated 800. System 800 can include a channel 802 that may be coupled to a preamp 804 that may be coupled to a head 806. Generally, the operations of the channel 802, preamp 804, and head 806 are the same as the channel 102, preamp 104, and head 106 described above with regard to FIG. 1 and will not be described again.

As illustrated, the channel 802 may include a write driver 808. The write driver 808 may be coupled to a writer A 810 and a writer B 812 of the preamp 804. The writer A 810 and the writer B 812 may be coupled to a write transducer A 814 and a write transducer B 816 of the head 806, respectively. Each of the channel 802, preamp 804, head 806, a write driver 808, writer A 810, writer B 812, write transducer A 814 and write transducer B 816 may be a separate circuit, a system on chip (SOC), firmware, a processor(s), or other system not listed, or any combination thereof.

FIG. 8 illustrates the inducement and cancellation of noise on an inactive write path (here, the path between writer A 810 and the write transducer A 814) by a proximal active write path (here, the path between writer B 812 and the write transducer B 816) by a write operation. As illustrated, the write driver 808 may output a write driver signal 818 to the writers A 810 and B 812. In the illustrated example, the write driver signal 818 may instruct the writer B 812 to output an active driver signal 820 to the write transducer B 816. The active driver signal 820 may cause coupling 1 822 across the traces connecting the preamp 804 to the head 806. Further, the active driver signal 820 may cause coupling between the write transducer A 814 and the write transducer B 816 of the head 806. As such, without correction, the write transducer A 814 may be driven to cause unintentional recording by an induced noise signal on the inactive write path.

To cancel (e.g. reduce or eliminate) the induced noise signal, the write driver signal 818 may instruct the writer A 810 of the preamp 804 to act as a driver and output a driven cancellation signal 826 on the victim line(s) between the writer A 810 and the write transducer A 814 such that the victim transducer of the write transducer A 814 may become the point where the noise is canceled.

For example, the writer A 810 may output an opposite polarity "overshoot" like pulse that is time-aligned with the output of the active driver signal 820 by the write driver B 812 in a manner to cancel the capacitive coupled writer noise from the aggressor (active) transducer (e.g. write transducer B 816). In some example embodiments, such as in a hard disk drive system, the opposite waveform cancellation may be performed using standard driver knobs on the inactive write driver. The overshoot and duration may be optimized such that the residual coupled noise is reduced. A feedback mechanism using side track erasure, or written noise signature under the inactive coil may be observed and minimized during optimization of the noise cancellation circuit.

Some example embodiments may utilize a fixed or programmable analog filter that closely represents the transfer function between the two transducers and interconnect paths. Therefore, the inactive writer (e.g. writer A 810) attached to the non-active write transducer A 814 may be fed a filtered version of the output from the writer B 812. This filtered version may be applied in opposite polarity to the coupled signal present and may therefore reduce the noise at the inactive transducer.

The transfer function may be generally set forth as follows:

$$y1(s) = X_{main} * H_1(s)$$

$$y2(s) = X_{cancel} * H_2(s)$$

$$n(s) = X_{main} * H_t(s)$$

$$y2(s) + n(s) = 0$$

$$y2(s) = -n(s)$$

$$y2(s) = -n(s) = X_{cancel} * H_2(s)$$

$$X_{cancel} = -n(s)/H_2(s)$$

$$X_{cancel} = X_{main} * H_t(s)/H_2(s)$$

where y1(s) is the active write current, y2(s) is the anti-noise current, n(s) is the noise current, $X_{main}$ is the active write signal, $X_{cancel}$ is the driven cancel signal, $H_1(s)$ is the function for current signals along the path from the writer B 810 to the write transducer B 814, $H_2(s)$ is the function for current signals along the path from the writer A 810 to the write transducer A 814, and $H_t(s)$ is the transfer function for coupled noise to the write transducer A 814.

This transfer function may be implemented via a programmable analog filter design or a FIR may be placed in the preamp and LMS interference cancellation could be applied. In some embodiments, most of the gross characteristics of the transfer function between AC-Coupled transducers may be captured adequately by a FIR with 3-5 taps. The delay path of such a FIR may be small.

The above discussion relates to cancellation of induced noise in an inactive transducer resulting from an active transducer. However, some embodiments may perform noise cancellation for simultaneously operating transducers, for example, by modifying the active driver signals prior to output such that the current seen at the transducers is correct.

Figure 9:
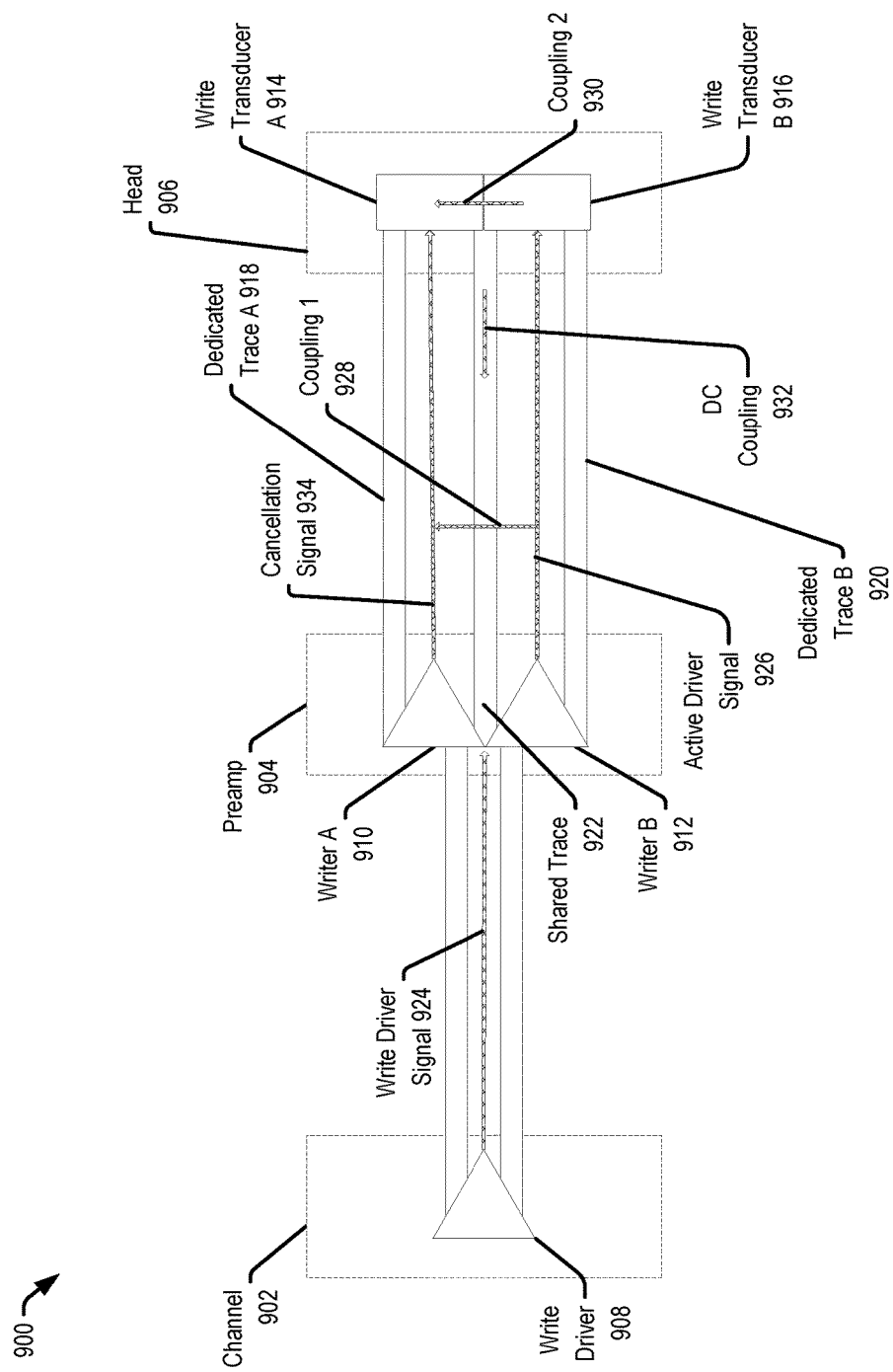
FIG. 9 is a block diagram of a system of noise cancellation in multi-transducer recording, in accordance with certain embodiments of the present disclosure.

Referring to FIG. 9, a block diagram of a system of noise cancellation in multi-transducer recording is shown and is generally designated 900. System 900 can include a channel 902 that may be coupled to a preamp 904 that may be coupled to a head 906. Generally, the operations of the channel 902, preamp 904, and head 906 are the same as the channel 102, preamp 104, and head 106 described above with regard to FIG. 1 and will not be described again.

As illustrated, the channel 902 may include a write driver 908. The write driver 908 may be coupled to a writer A 910 and a writer B 912 of the preamp 904. The writer A 910 may be coupled to a write transducer A 914 of the head 906 via the dedicated trace A 918. The writer B 912 may be coupled to a write transducer B 916 of the head 906 via the dedicated trace B 920. Both the writer A 910 and the writer B 912 may be coupled to both write transducer A 914 and write transducer B 916 via the shared trace 922. Each of the channel 902, preamp 904, head 906, a write driver 908, writer A 910, writer B 912, write transducer A 914 and write transducer B 916 may be a separate circuit, a system on chip (SOC), firmware, a processor(s), or other system not listed, or any combination thereof.

FIG. 9 illustrates the inducement and cancellation of noise on an inactive write path (here, the path between writer A 910 and the write transducer A 914) by a proximal active write path (here, the path between writer B 912 and the write transducer B 916) by a write operation where the inactive and active write paths share a shared trace 922. As illustrated, the write driver 908 may output a write driver signal 924 to the writers A 910 and B 912. In the illustrated example, the write driver signal 924 may instruct the writer B 912 to output an active driver signal 926 to the write transducer B 916. The active driver signal 926 may cause coupling 1 928 across the traces connecting the preamp 904 to the head 906. Further, the active driver signal 926 may cause coupling between the write transducer A 914 and the write transducer B 916 of the head 906. Moreover, DC coupling 932 may arise due to the shared trace 922. As such, without noise cancellation, the write transducer A 914 may be driven to cause unintentional recording by an induced noise signal on the inactive write path.

Cancellation of the noise may be performed in a variety of ways. Some implementations may utilize the driver circuits for both the inactive writer and the active writer. More particularly, the second driver may be used when in idle to cancel out aggressor noise at the inactive write transducer A 914 as described below.

Some implementations may have the secondary driver output the opposing "DC" and AC content that is seen on the inactive write coil of the write transducer A 914 using steady state current (Iwss) and overshoot amplitude (Iosa) DAC scaling that may be optimized to cancel out the aggressor signal. For example, in a shared trace configuration, there may be some DC content and asymmetric offset to the coupled signal on the inactive coil. Some implementations may utilize Iwss, Iosa, overshoot duration (Iosd) and asymmetry knobs to provide an optimized opposite wave shape to cancel the noise.

The cancellation signal 934 may be a function of the active write signal current. In addition, a feedback mechanism for optimization of the cancellation signal 934 may utilize side track erasure or written noise signature under the inactive coil and may be utilized during optimization of the cancellation signal generation operation circuit during a certification process.

In addition or alternatively, in some embodiments, the driver on the inactive lines may apply an opposite signal that is equalized to cancel the aggressor noise at the inactive coil (write transducer A 914) to optimally cancel the aggressor signal on the inactive coil. In embodiments in which the transfer function is determined, a programmable filter can be designed that replicates the frequency response of the coupled noise to the inactive transducer and the secondary through path from the inactive coil to the writer A 910. The writer A 910 may apply a filtered signal calculated from the transfer function at opposite polarity to cancel noise.

The transfer function can be generally set forth as follows:

$$y1(s) = X_{main} * H_1(s)$$

$$y2(s) = X_{cancel} * H_2(s)$$

$$n(s) = X_{main} * H_t(s)$$

$$y2(s) + n(s) = 0$$

$$y2(s) = -n(s)$$

$$y2(s) = -n(s) = X_{cancel} * H_2(s)$$

$$X_{cancel} = -n(s)/H_2(s)$$

$$X_{cancel} = X_{main} * H_t(s)/H_2(s)$$

where y1(s) is the active write current, y2(s) is the anti-noise current, n(s) is the noise current, $X_{main}$ is the active write signal, $X_{cancel}$ is the driven cancel signal, $H_1(s)$ is the function for current signals along the path from the writer B 910 to the write transducer B 914, $H_2(s)$ is the function for current signals along the path from the writer A 910 to the write transducer A 914, and $H_t(s)$ is the transfer function for coupled noise to the write transducer A 914.

In some embodiments, a LMS noise canceling circuit may be implemented within the preamp using a FIR to equalize the output of the inactive driver to cancel the noise seen at the inactive coil (write transducer A 914). Since the writer A 910 may have no direct knowledge of the noise present on the coil of the write transducer A 914, the noise may be approximated by using transfer functions (shown above) that may be known a priori. The transfer functions may include the path that allows the coupled noise to the inactive coil ($H_t(s)$) and the path for the anti-noise driver to the inactive coil ($H_2(s)$). The preamp may then estimate the noise at the coil by filtering the active writer current through these transfer functions. Once this is known, adaptive LMS noise cancellation methods may be applied to reduce the coupled noise at the inactive coil.

Figure 10:
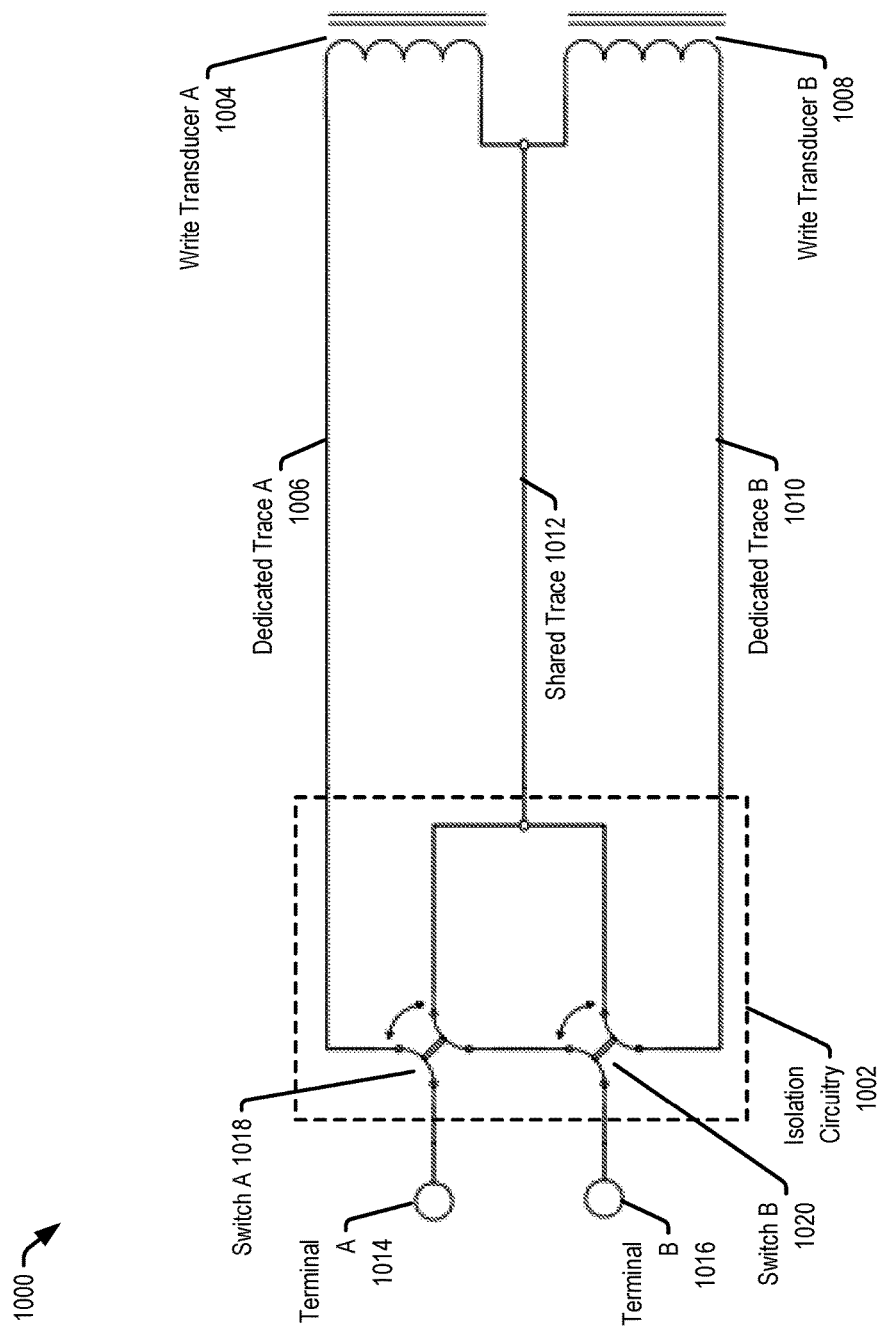
FIG. 10 is a block diagram of a system of noise cancellation in multi-transducer recording, in accordance with certain embodiments of the present disclosure.

Referring to FIG. 10, a block diagram of a system of noise cancellation in multi-transducer recording is shown and is generally designated 1000. In particular, system 1000 may include isolation circuitry 1002 to allow a single writer to be switched between multiple write transducers.

In embodiments where two transducers (e.g. write transducers) may share a trace or electrical connection, the noise becomes worse for the victim line due to the DC content coupled to the inactive transducer. However, some of this DC content may be eliminated through isolation and switching circuitry.

In particular, the isolation circuitry 1002 may be coupled to a write transducer A 1004 via the dedicated trace A 1006. The isolation circuitry 1002 may be coupled to a write transducer B 1008 via the dedicated trace B 1010. Further, the isolation circuitry 1002 may be coupled to both write transducer A 1004 and write transducer B 1008 via the shared trace 1012. The isolation circuitry 1002 may also be coupled to a writer (not shown) via terminal A 1014 and via terminal 1016.

The isolation circuitry 1002 may include traces and switches to switch the connection of the writer between write transducer A 1004 and write transducer B 1008. In particular, system 1000 is illustrated as switching between two configurations. In the first configuration, control signal(s) may cause the switch A 1018 to establish a connection between terminal A 1014 and dedicated trace A 1006 and the switch 1020 to establish a connection between terminal B 1016 and shared trace A 1012. In this way, the writer may be connected to the write transducer A 1004 while write transducer B 1006 is isolated from the DC current. In the second configuration, control signal(s) may cause the switch A 1018 to establish a connection between terminal A 1014 and shared trace 1012 and the switch 1020 to establish a connection between terminal B 1016 and dedicated trace B 1010. In this way, the writer may be connected to the write transducer B 1006 while write transducer A 100 is isolated from the DC current.

The isolation circuitry 1002 of system 1000 may isolate one coil from DC coupling. However, system 1000 may not rid the AC coupling entirely.

Figure 11:
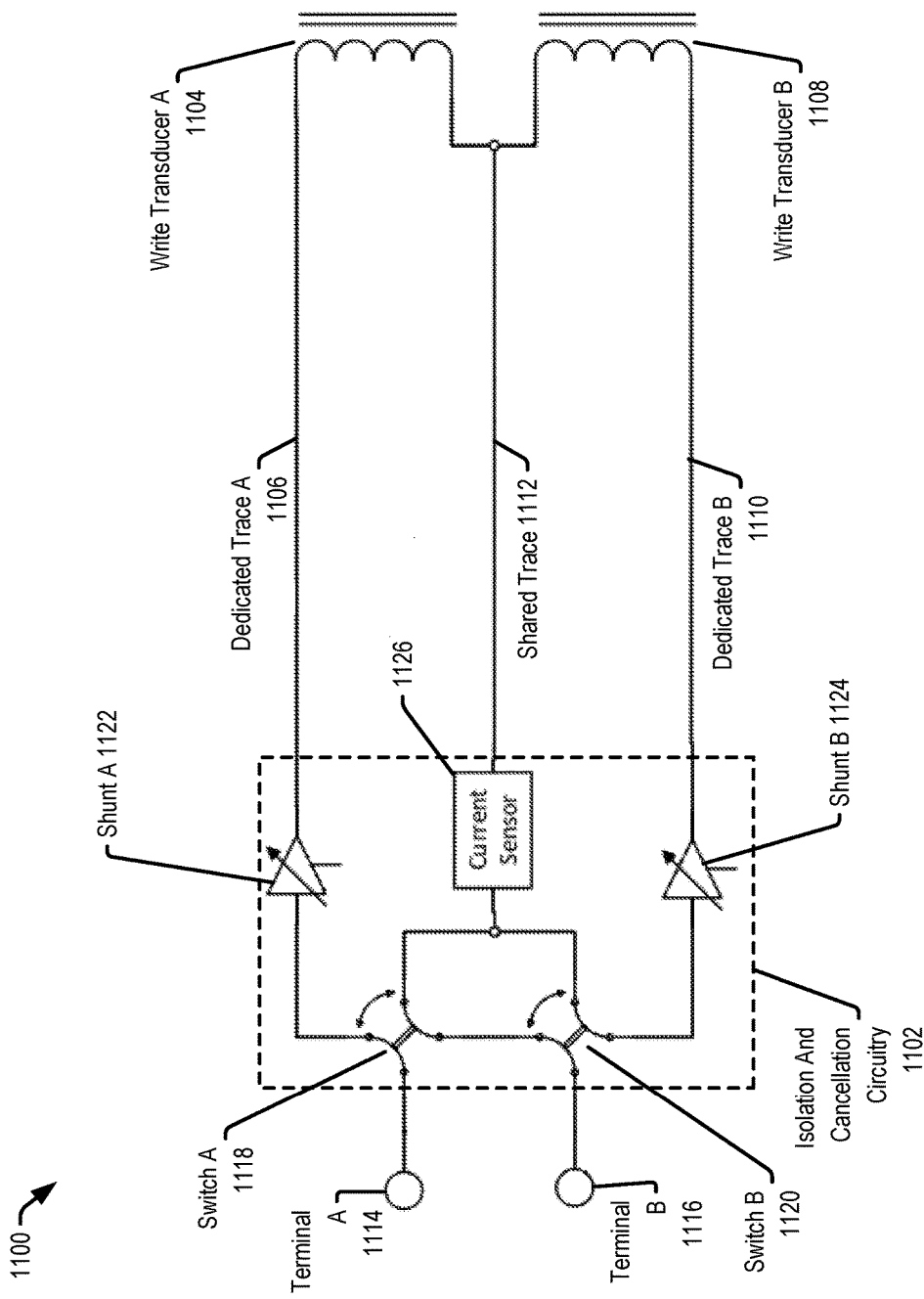
FIG. 11 is a block diagram of a system of noise cancellation in multi-transducer recording, in accordance with certain embodiments of the present disclosure.

Referring to FIG. 11, a block diagram of a system of noise cancellation in multi-transducer recording is shown and is generally designated 1100. In particular, system 1100 may include isolation and cancellation circuitry 1102 to allow a single writer to be switched between multiple write transducers and to output a cancellation signal to reduce or eliminate coupling noise at the inactive write transducer.

In particular, the isolation and cancellation circuitry 1102 may be coupled to a write transducer A 1104 via the dedicated trace A 1106. The isolation circuitry 1102 may be coupled to a write transducer B 1108 via the dedicated trace B 1110. Further, the isolation and cancellation circuitry 1102 may be coupled to both write transducer A 1104 and write transducer B 1108 via the shared trace 1112. The isolation and cancellation circuitry 1102 may also be coupled to a writer (not shown) via terminal A 1114 and via terminal B 1116.

The isolation and cancellation circuitry 1102 may include traces and switches to switch the connection of the writer between write transducer A 1104 and write transducer B 1108. In particular, system 1100 is illustrated as switching between two configurations. In the first configuration, control signal(s) may cause the switch A 1118 to establish a connection between terminal A 1114 and dedicated trace A 1106 and the switch 1120 to establish a connection between terminal B 1116 and shared trace A 1112. In this way, the writer may be connected to the write transducer A 1104 while write transducer B 1106 is isolated from the DC current. In the second configuration, control signal(s) may cause the switch A 1118 to establish a connection between terminal A 1114 and shared trace 1112 and the switch 1120 to establish a connection between terminal B 1116 and dedicated trace B 1110. In this way, the writer may be connected to the write transducer B 1106 while write transducer A 1104 is isolated from the DC current. In this way, the isolation and cancellation circuitry 1102 of system 1100 may isolate one coil from DC coupling.

In addition, the isolation and cancellation circuitry 1102 of system 1100 may include a shunt A 1122 on the path between switch A 1118 and the write transducer A 1104, a shunt B 1124 on the path between switch B 1120 and the write transducer B 1108, and a current sensor 1126 on the path between switch A 1118 and switch B 1120 and the shared trace 1112.

When the isolation and cancellation circuitry 1102 is operating in the first configuration and the write transducer A 1104 is being driven, the current sensor 1126 may detect the current on the shared trace 1112 and the shunt B 1124 may output a reverse of the detected current to the write transducer B 1108 to reduce or eliminate noise at the write transducer B 1108. Similarly, when the isolation and cancellation circuitry 1102 is operating 1126 in the second configuration and the write transducer B 1108 is being driven, the current sensor 1126 may detect the current on the shared trace 1112 and the shunt A 1122 may output a reverse of the detected current to the write transducer A 1104 to reduce or eliminate noise at the write transducer A 1104.

Figure 12:
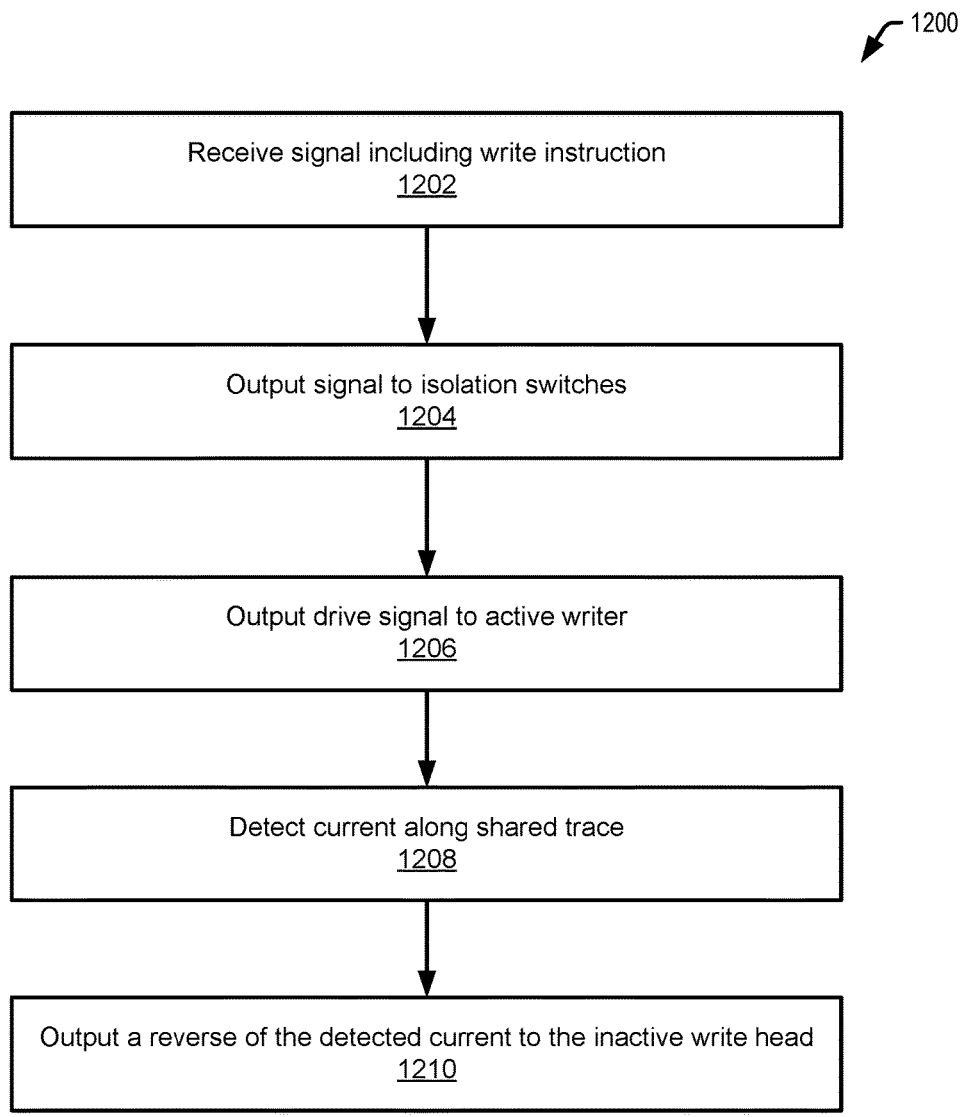
FIG. 12 is a flowchart of a method of noise cancellation in multi-transducer recording, in accordance with certain embodiments of the present disclosure.

Referring to FIG. 12, a flowchart of a method of noise cancellation in multi-transducer recording is shown and is generally designated 1200. The method 1200 can be an embodiment of the system 1100.

The preamp may receive a signal including a write instruction at 1202. At 1204, the preamp may output control signals to the isolation switches to configure the switches for an output to one of the write transducers. At 1206, the writer may output an active write signal to the active writer. At 1208, a current sensor may detect current along the shared trace. At 1210, a shunt along the inactive trace may be driven to output a reverse of the detected current to the inactive write transducer.

All steps listed for the method 1200 may be applied to systems that have multi-transducer recording with coupling between adjacent transducers. This and other variations would be apparent to one of ordinary skill in the art in view of this specification. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 13:
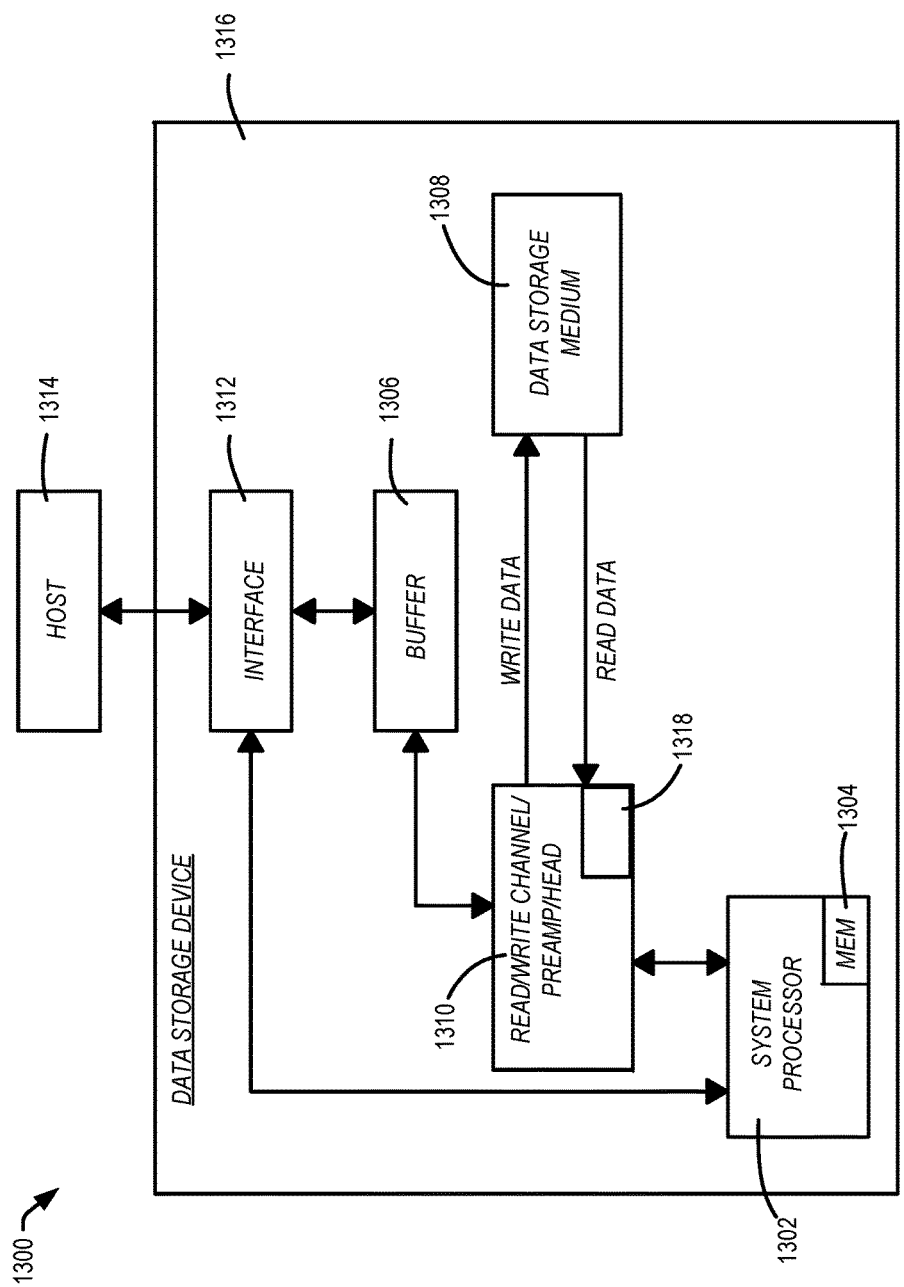
FIG. 13 is a block diagram of a system of noise cancellation for simultaneous sensor and writer operation and multi-transducer recording, in accordance with certain embodiments of the present disclosure.

Referring to FIG. 13, a block diagram of a system of noise cancellation for simultaneous sensor and writer operation and multi-transducer recording is shown and generally designated 1300. The system 1300 can be an example of a data storage device (DSD), and may be an example implementation of systems 100-1100. The DSD 1316 can optionally connect to and be removable from a host device 1314, which can be a device or system having stored data, such as a desktop computer, a laptop computer, a server, a digital video recorder, a photocopier, a telephone, a music player, other electronic devices or systems not listed, or any combination thereof. The data storage device 1316 can communicate with the host device 1314 via the hardware/firmware based host interface circuit 1312 that may include a connector (not shown) that allows the DSD 1316 to be physically connected and disconnected from the host 1314.

The DSD 1316 can include a system processor 1302, which may be a programmable controller, and associated memory 1304. The system processor 1302 may be part of a system on chip (SOC). A buffer 1306 may temporarily store data during read and write operations and can include a command queue. The read/write (R/W) channel/preamp/head 1310 can encode data during write operations to, and reconstruct data during read operations from, the data storage medium 1308. The data storage medium 1308 is shown and described as a hard disc drive, but may be other types of medium, such as a flash medium, optical medium, or other medium, or any combination thereof.

The R/W channel/preamp/head 1310 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel/preamp/head 1310 can combine multiple inputs and provide a single output.

The block 1318 can implement all of or part of the systems and functionality of systems 100-1100. In some embodiments, the block 1318 may be a separate circuit, integrated into the R/W channel/preamp/head 1310, included in a system on chip, firmware, software, or any combination thereof.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
a first output driver connected to a first output via a first trace;
a second output driver connected to a second output via a second trace;
the first output driver configured to output a first drive signal to the first output to drive the first output, the first drive signal causing first induced noise in the second trace;
the second output driver configured to output a second drive signal based on the first drive signal, the second drive signal reducing the magnitude of the first induced noise at the second output.

2. The system of claim 1, further comprising:
the second output driver configured to output a third drive signal to the second output to drive the second output, the third drive signal causing second induced noise in the first trace;
the first output driver configured to output a fourth drive signal based on the second drive signal, the fourth drive signal reducing the magnitude of the second induced noise at the first output.

3. The system of claim 1, further comprising:
a shared trace connected to the first output and the second output at a first terminal;
a first switch configured to selectively connect a first terminal of the first output driver to the first trace in response to a first control signal and to selectively connect the first terminal of the first output driver to a second terminal of the shared trace in response to a second control signal;
a second switch configured to selectively connect a second terminal of the first output driver to the second terminal of the shared trace in response to the first control signal.

4. The system of claim 3, further comprising the second output driver being a shunt device that applies the second drive signal to reduce the magnitude of the first induced noise at the second output, the second drive signal being reverse current to the first induced noise.

5. The system of claim 4, further comprising:
the shared trace including a current sensor configured to measure a current value on the shared trace, the second drive signal being based on the measured current value.

6. The system of claim 5, further comprising a preamplifier of a magnetic recording system that includes the first output driver and second output driver.

7. The system of claim 1, further comprising a preamplifier of the magnetic recording system including an adaptation circuit configured to perform an update of one or more parameters of the second output driver used to generate the second drive signal based on a transfer function of coupled noise to the second output.

8. An apparatus comprising:
a first output driver;
a first trace connected to a first output at a first terminal of the first trace;
a second trace connected to a second output at a first terminal of the second trace;
a shared trace connected to the first output and the second output at a first terminal of the shared trace;
a first switch configured to selectively connect a first terminal of the first output driver to a second terminal of the first trace in response to a first control signal and to selectively connect the first terminal of the first output driver to a second terminal of the shared trace in response to a second control signal;
a second switch configured to selectively connect a second terminal of the first output driver to the second terminal of the shared trace in response to the first control signal and to selectively connect the first terminal of the first output driver to a second terminal of the second trace in response to the second control signal;
the first output driver configured to output a first drive signal to the first output to drive the first output in response to the first control signal, the first drive signal causing first induced noise at the second output.

9. The apparatus of claim 8, further comprising a second output driver configured to output a second drive signal based on the first drive signal, the second drive signal reducing a magnitude of a first induced noise at the second output.

10. The apparatus of claim 9, further comprising the second output driver being a shunt device that applies the second drive signal to reduce a magnitude of the first induced noise at the second output, the second drive signal being reverse current to the first induced noise.

11. The apparatus of claim 10, further comprising:
the first output driver further configured to output a third drive signal to the second output to drive the second output in response to the second control signal, the third drive signal causing second induced noise at the first output;
a third output driver that is a shunt device that applies a fourth drive signal based on the third drive signal to reduce a magnitude of a second induced noise at the first output, the second drive signal being reverse current to the second induced noise.

12. The apparatus of claim 11, further comprising:
the shared trace including a current sensor configured to measure a current value on the shared trace when the first output driver outputs the first drive signal to the first output in response to the first control signal, the second drive signal being based on the measured current value.

13. The apparatus of claim 9, further comprising:
the current sensor configured to measure a current value on the shared trace when the first output driver outputs the second drive signal to the second output in response to the second control signal, the third drive signal being based on the measured current value.

14. The apparatus of claim 8, further comprising the first output being a first write coil of a magnetic recording system head and the second output being a second write coil of the magnetic recording system head.

15. A system comprising:
a first write driver, a first terminal of the first write driver connected to a first terminal of a first writer coil via a first trace;

a second write driver, a first terminal of the second write driver connected to a first terminal of a second writer coil via a second trace;

the first write driver configured to output a first drive signal to the first writer coil to drive the first writer coil, the first drive signal causing first induced noise in the second trace;

the second write driver configured to output a second drive signal based on the first drive signal, the second drive signal reducing the magnitude of the first induced noise at the second writer coil.

16. The system of claim 15, further comprising:
the second write driver configured to output a third drive signal to the second writer coil to drive the second writer coil, the third drive signal causing second induced noise in the first trace;
the first write driver configured to output a fourth drive signal based on the second drive signal, the fourth drive signal reducing the magnitude of the second induced noise at the first writer coil.

17. The system of claim 15, further comprising:
the second write driver outputting the second drive signal using a filter that approximates a transfer function of a coupling between the first trace and the second trace.

18. The system of claim 15, further comprising:
a shared trace connected to the first write driver and the second write driver at the first terminal;
a first switch configured to selectively connect a first terminal of the first write driver to the first trace in response to a first control signal and to selectively connect the first terminal of the first write driver to a second terminal of the shared trace in response to a second control signal;
a second switch configured to selectively connect a second terminal of the first write driver to the second terminal of the shared trace in response to the first control signal.

19. The system of claim 18, further comprising the second write driver being a shunt device that applies the second drive signal to reduce the magnitude of the first induced noise at the second write driver, the second drive signal being reverse current to the first induced noise.

20. The system of claim 19, further comprising:
the shared trace including a current sensor configured to measure a current value on the shared trace, the second drive signal being based on the measured current value.

* * * * *